US011473975B2

(12) United States Patent
Liang

(10) Patent No.: US 11,473,975 B2
(45) Date of Patent: Oct. 18, 2022

(54) LOW-COST, COMPACT CHROMATIC CONFOCAL MODULE

(71) Applicant: Arizona Board of Regents on Behalf of the University of Arizona, Tucson, AZ (US)

(72) Inventor: Rongguang Liang, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 48 days.

(21) Appl. No.: 17/054,735

(22) PCT Filed: May 9, 2019

(86) PCT No.: PCT/US2019/031600
§ 371 (c)(1),
(2) Date: Nov. 11, 2020

(87) PCT Pub. No.: WO2019/217735
PCT Pub. Date: Nov. 14, 2019

(65) Prior Publication Data
US 2021/0239525 A1    Aug. 5, 2021

Related U.S. Application Data

(60) Provisional application No. 62/670,587, filed on May 11, 2018.

(51) Int. Cl.
*G01J 3/02* (2006.01)
*G01J 3/06* (2006.01)
*G01J 3/44* (2006.01)
(52) U.S. Cl.
CPC .............. *G01J 3/021* (2013.01); *G01J 3/0229* (2013.01); *G01J 3/06* (2013.01); *G01J 3/4406* (2013.01)

(58) Field of Classification Search
CPC ........ G01J 3/02; G01J 3/28; G01J 3/14; G01J 3/10
See application file for complete search history.

(56) References Cited

U.S. PATENT DOCUMENTS 3,013,467 A    12/1961    Minsky
6,934,079 B2   8/2005     Hell et al.
(Continued)

OTHER PUBLICATIONS

International Search Report and Written Opinion dated Jul. 19, 2019 for International Patent Application No. PCT/US2019/031600 (11 pages).

(Continued)

*Primary Examiner* — Abdullahi Nur
(74) *Attorney, Agent, or Firm* — Perkins Coie LLP

(57) ABSTRACT

Devices, systems and methods for use in confocal imaging systems are described that enable lateral and axial scans at high speeds and without a moving scanner while producing high quality images. One chromatic confocal optical head includes an illumination source, such as an addressable point source array, to provide a wide spectrum illumination including multiple wavelengths. The optical head also includes a beamsplitter to allow the light to be directed toward an object, to receive the reflected light from the object and to direct the reflected light toward a detector. The optical head further includes a pinhole mask that is positioned to receive the light that is reflected from the object after passing through the beamsplitter, and a dispersion element that is positioned to receive the light after passing through the pinhole mask, and to separate the light into multiple spectral components for reception by the detector.

23 Claims, 8 Drawing Sheets

(56) References Cited

U.S. PATENT DOCUMENTS

| | | | |
|---|---|---|---|
| 2004/0186382 A1* | 9/2004 | Modell | A61B 1/00059 |
| | | | 600/476 |
| 2010/0142355 A1* | 6/2010 | Katayama | G11B 7/1353 |
| 2015/0253557 A1 | 9/2015 | Kalkbrenner | |
| 2016/0231171 A1* | 8/2016 | Assefa | G01J 3/0272 |
| 2017/0059408 A1 | 3/2017 | Körner et al. | |
| 2017/0343477 A1 | 11/2017 | Santori et al. | |
| 2017/0343784 A1* | 11/2017 | Wu | G02B 21/004 |
| 2018/0094975 A1 | 4/2018 | Marsaut et al. | |

OTHER PUBLICATIONS

Toomre, D.K., et al., "Education in Microscopy and Digital Imaging", Zeiss Microscopy Online Campus, Available at: http://zeiss-campus.magnet.fsu.edu/articles/spinningdisk/introduction.html.

Cha, Sungdo, et al., "Nontranslational three-dimensional profilometry by chromatic confocal microscopy with dynamically configurable micromirror scanning," Appl. Opt. 39, 2605-2613 (2000).

Hillenbrand, Matthias, et al., "Chromatic confocal matrix sensor with actuated pinhole arrays," Appl. Opt. 54, 4927-4936 (2015).

* cited by examiner ic Confocal Module," filed
LOW-COST, COMPACT CHROMATIC CONFOCAL MODULE

CROSS REFERENCE TO RELATED APPLICATIONS

This patent document is a 371 National Phase Application of International Patent Application No. PCT/US2019/031600, filed May 9, 2019, which claims priority to the provisional application with Ser. No. 62/670,587, titled "Low-Cost, Compact Chromatic Confocal Module," filed May 11, 2018. The entire contents of the above noted applications are incorporated by reference as part of the disclosure of this document.

TECHNICAL FIELD

The disclosed embodiments relate to optical imaging system and in particular to confocal imaging systems.

BACKGROUND

Since their invention in the 1950s, confocal microscopes have been extensively investigated to provide better imaging performance for applications that range from metrology to tissue imaging. In its basic configuration, a confocal microscope is a point imaging system that includes a pinhole to block out the light outside of the focused spot before reaching a detector. This is also a major limitation of the confocal microscope, as a lateral scanning mechanism is needed to scan the pinhole across the object to obtain a 2-dimensional (2D) confocal image. The simplest way to implement the lateral scanning is to move the object or to scan the confocal head, both of which are characterized as having a low scanning speed. High-speed single point scanning methods using various high-speed scanners, such as a galvo-scanner, a MEMS scanner, or a raster scanner, have been developed and commercialized. Line scan is one approach to increase the imaging speed, but has the drawback of having cross-talk along the scan lines. To further improve the scanning speed, array scanning methods, such as using a Nipkow spinning disk, have been developed, as well. But these techniques require a moving element, which can make the design more expensive.

SUMMARY

The disclosed embodiments relate to devices, methods and systems that enable lateral and axial scans in a confocal imaging system at high speeds and without a moving scanner. The disclosed devices and systems produce high quality images, operate at high efficiencies and have a compact form factor that reduces that cost of their implementation. One aspect of the disclosed embodiments relates to a chromatic confocal optical head for use in a confocal imaging system that includes an illumination source including an addressable wide spectrum point source array to provide light having a wide spectrum including multiple wavelengths for illuminating an object. The chromatic confocal optical head further includes a beamsplitter configured to allow light from the illumination source to pass therethrough, or reflect from, toward the object, and to receive light reflected from the object and allow the light received from the object to propagate toward a detector. The chromatic confocal optical head additionally includes a first pinhole mask having a plurality of pinholes and positioned to receive the light that is reflected from the object after passing through the beamsplitter, and one or more dispersion elements positioned to receive the light that is reflected from the object after passing through the first pinhole mask, and to separate the light that passes therethrough into multiple spectral components for reception by the detector.

The disclosed embodiments that be implemented in, for example, microscopes, endoscopes and other confocal imaging system that require, or can benefit from, compact optical components for imaging, such as 2D and 3D imaging systems, with applications that range from scientific instruments, to medical imaging and others.

DETAILED DESCRIPTION

Figure 1:
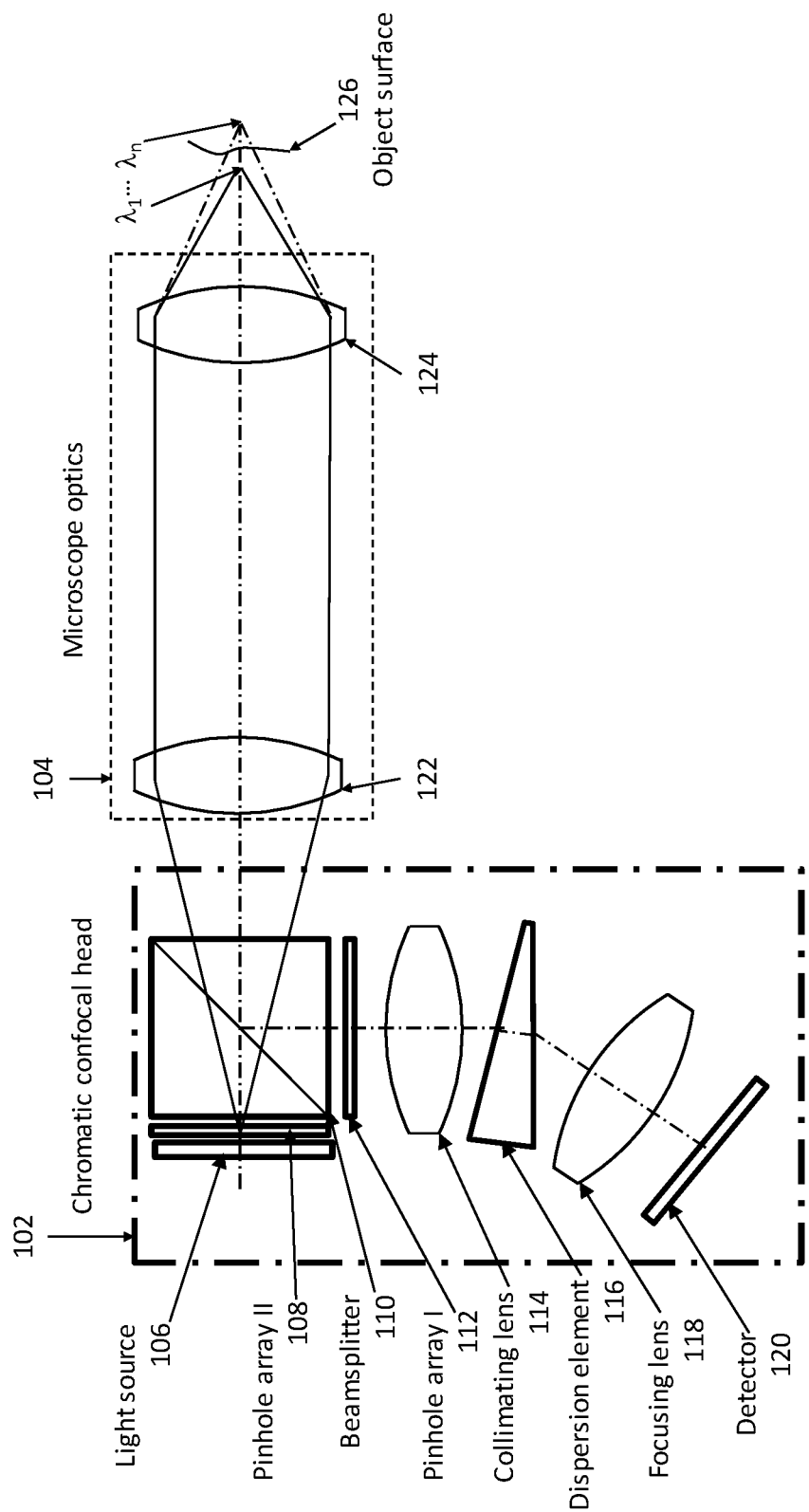
FIG. 1 illustrates a confocal imaging system in accordance with an exemplary embodiment.

In this document, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

In the past two decades, spatial light modulators, such as Texas Instrument's digital micromirror device (DMD), have been used to conduct lateral scans in confocal imaging systems without having moving parts. That is, different DMD pixels are turned on in sequence to simulate a moving point source that is used to laterally scan across the object. One limitation of the DMDs and similar devices, however, is that their light efficiency is relatively low because illumination is provided for the entire chip even when only some of pixels are required to turn on for each captured image.

In order to obtain depth information, in addition to lateral scan, an axial scan is also needed, which is traditionally carried out using an axial scanner that moves the object or the confocal scan head. In such systems, however, the scan speed is typically slow. In recent years, some systems have deployed a tunable lens to conduct the axial scan, but such implementations provide low quality images. Using the unique properties of chromatic aberration, chromatic confocal imaging methods have also been developed to perform an axial scan without moving parts. The principle is that light with different wavelengths comes to focus at different depths or distances. Thus, when an object is illuminated with such a multi-spectral light, the detection of the spectral component with the highest intensity corresponds to the light that is focused exactly on the object's surface or the internal structure. A spectrometer that is placed in the detection path can identify the wavelengths associated with the strongest signals, and use that information to generate depth information. Some configurations of confocal microscopes use a DMD to achieve lateral scanning and use a tunable light source and an objective with chromatic aberration to implement axial scanning. Such systems, however, are expensive due to the tunable light source. In addition, light efficiency of the system is low because only some of the micromirrors are on for imaging in each frame while the entire DMD mirror array is illuminated. In certain configurations, MEMS pinhole arrays are used for lateral scanning, which can be combined with the above noted chromatic aberration techniques to conduct the lateral scanning. But such systems need a moving mechanism to scan the pinhole array.

In some systems, an array of light sources has been used to conduct lateral scanning. Such light source arrays are addressable, can be turned on/off individually, and thus can operate at a high efficiency because only the light sources that are used for producing each frame can be turned on. However, such systems can only conduct lateral scanning, while axial scanning is still needed. In addition, the system configuration is complicated because a relay optical system is needed to image the light source array to the pinhole array. The presence of such relay optics for imaging the light source onto the pinhole array, increases the cost of the system, requires alignment operations, and increases the size (e.g., length) of the system.

There is thus a need for a confocal imaging system that can conduct lateral and axial scans at a high speed, produce high quality images, operate at high efficiencies, while has a compact form factor and is low cost. These and other features and benefits are achieved by the disclosed compact chromatic confocal imaging systems that are described herein.

FIG. 1 illustrates a confocal imaging system in accordance with an exemplary embodiment. As shown in FIG. 1, the light from light source 106 (e.g., an active broadband point source array) passes through pinhole array II 108 (optional), and onto a beamsplitter 110 that is then focused onto the object (object surface 126 is shown) through the microscopic optics 104 with chromatic aberrations. It should be noted that in this document, a pinhole array is sometimes referred to as a pinhole mask. The exemplary microscope optics 104 depicted in FIG. 1 includes an objective 124 with chromatic aberrations and a tube lens 122. Examples of the broadband light source array include a micro LED array or micro organic LED (OLED) panel. Upon passing through the microscope optics 104, light with different wavelengths is focused at different depths, labeled $\lambda_1, \ldots, \lambda_n$, which are located on or in the vicinity of the object surface 126. As shown in the exemplary configuration of FIG. 1, some of the focal points are in front of the object surface 126, while other focal points are behind the object surface 126. The light reflected from the object is captured by the microscopic objective 124, passes through the tube lens 122, is reflected from the beamsplitter 110, and passes through the pinhole array I 112. The pinhole array I 112 has an array of pinholes with diameters smaller than the dimension of the light source 106 in the light source array, but the period of the pinholes (the distance between the pinholes) is the same as that of the light sources (the distance between the individual light sources). The pinhole array I 112 can be a static pinhole array or a tunable pinhole array, such as liquid crystal light modulator or digital micromirror device (DMD). The light from the pinholes in the pinhole array I 112 is collimated by the collimating lens 114 and then passes through the dispersion element 116, such as a prism or a grating. The dispersed light is then focused onto the detector 120 by the focusing lens 118. The detector 120 measures the spectrum of the light from each pinhole. The detector 120 can include, but is not limited to, a CMOS sensor, a charge coupled device (CCD), an InGaAs detector, or other types of detectors. To improve the performance and reduce the potential cross-talk, pinhole array II 108 with similar dimensions as the broadband light source array (e.g., same pitch) can be placed close to the light source 106 array so that each pinhole is aligned with a light source. The light source array (or the light source array and pinhole array II 108) and pinhole array I 112 are placed close to the beamsplitter 110, and are aligned so that each light source is conjugated to one pinhole in pinhole array I 112 with respect to the microscopic optics 104. The broken line illustrated as passing through the center of the components designates the optical axis.

In one example embodiment, the point source array is an addressable light source array; the dimensions of each of the addressable light source array and the beamsplitter can be in the range 0.5 to 1 inch. While there is no restriction on the distance between the beamsplitter to the pinhole array I, such a distance is preferred to be small, for example as small as 0.5 mm, so that the system will be more compact. The dimensions of the chromatic confocal head can be, for example, 1×1×4 inches. As shown in FIG. 1 for illustration purposes, the chromatic confocal head 102 can include the light source 106 (e.g., the active point source array), pinhole arrays I 112 and II 108, the beamsplitter 110, the collimating lens 114, the dispersion elements 116, the focusing lens 118, and the detector 120. It is, however, understood that the chromatic confocal head 102 may include additional or fewer elements. For example, some of the components (e.g., the detector 120, the light source 106, etc.) may reside outside of chromatic confocal head 102.

During the imaging process, individual broadband light sources of the addressable light source array are turned on/off according to a preset sequence to obtain a 2D image without cross-talk. For example, a controller or a processor (not shown) can be used to control the on-off sequencing of the light source. For instance, the processor can be coupled to a memory that includes instructions stored in the memory, which are executed by the processor to control the operations of the light source. The on/off sequencing of the light source effectuates lateral scanning that is perpendicular to the optical axis. The microscope objective can be custom designed to have pre-set chromatic aberrations so that the light with different wavelengths are focused at different depths. The custom objective can have different formats. One example format is to select the materials with large dispersion, another example format is to include a combination of a regular or standard objective and a strong dispersion element. The spectrum of the reflected light for each focal point is recorded by the detector, and from the detected spectrum, the depth information can be derived. As such, axial scanning (along the optical axis) of the object is effectuated. Such measurements and processing of lateral and axial scanning information can be carried out by the above noted processor or controller that is coupled to the detector. In some implementations, the above noted operations are carried out by a separate processor or controller, and/or carried out at least partially at a remote location (e.g., via cloud processing). Thus, based on the reflected light at each of the lateral and axial points scanned by the system volumetric information regarding the object can be obtained, which can be used to identify or evaluate surface and or internal characteristics of the object, to produce 2- and 3-D images and the like.

The above described volumetric confocal imaging system, among other benefits and features, is capable of conducing high-speed simultaneous lateral and axial scans of the object at a high light efficiency, without using any moving parts, without sacrificing image quality, while allowing the system to be implemented as a compact and cost-effective system due in-part to the placement of the light source (and pinhole II) and pinhole array I close to the beamsplitter.

Figure 2:
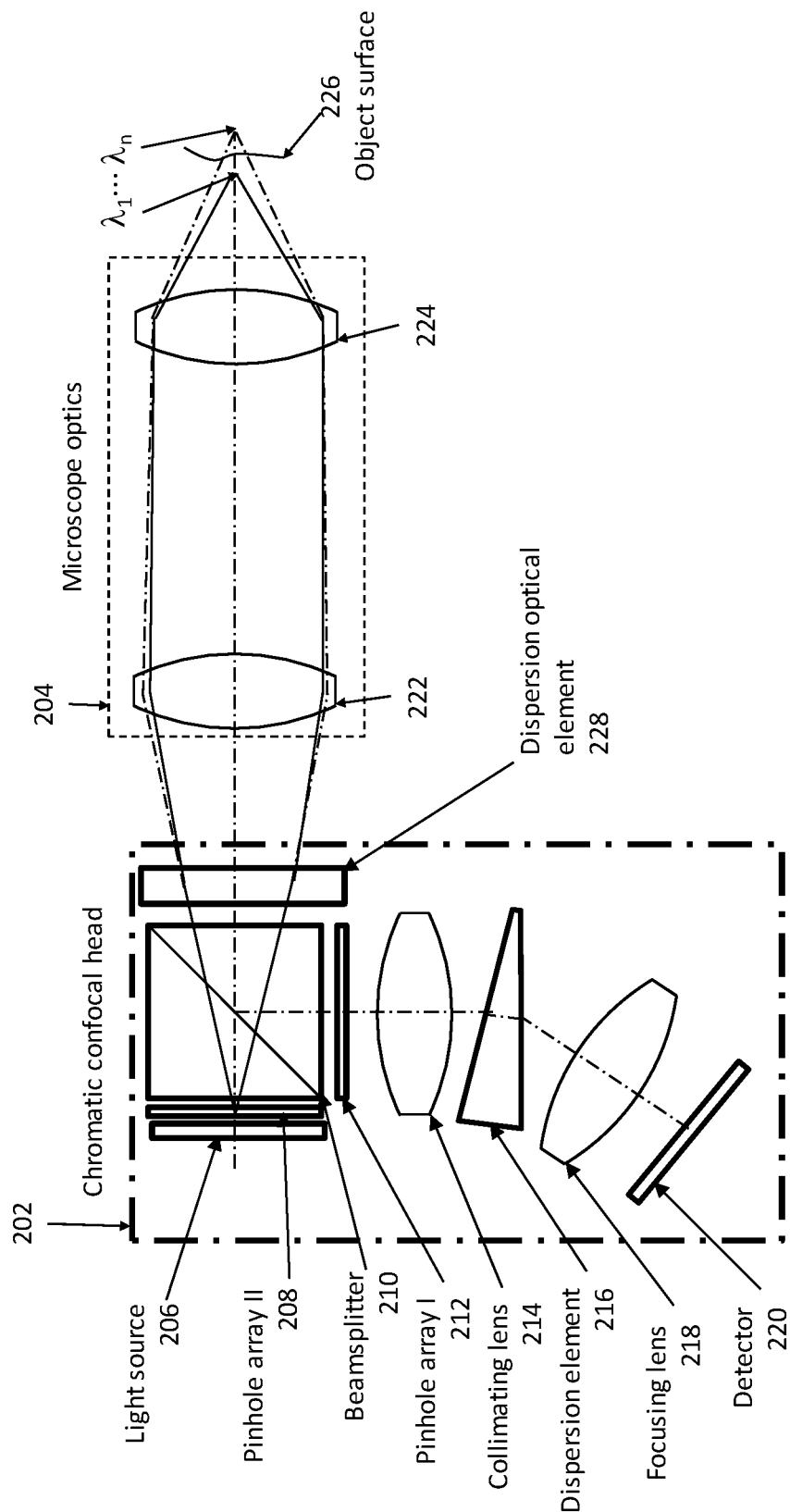
FIG. 2 illustrates a confocal imaging system in accordance with another exemplary embodiment.

FIG. 2 illustrates a confocal imaging system in accordance with another exemplary embodiment. In the exemplary system of FIG. 2, the microscope optics 204 subsection is a standard microscope optics subsection (e.g., an objective 224 and a tube lens 222) without chromatic aberrations. In contrast to FIG. 1, a dispersion optical element 228 (e.g., a prism or a grating) is added next to the beamsplitter 210 to disperse the light so that the light with different wavelengths can be focused at different depths after emerging from the standard microscopic optics 204. The remaining component in FIG. 2 that are part of the chromatic confocal head 202 (light source 206, pinhole array II 208, pinhole array I 212, collimating lens 214, dispersion element 216, focusing lens 218 and detector 220) can be similar to those described in connection with FIG. 1. In some embodiments, the chromatic confocal head 202 in FIG. 2 can be an attachment to a standard microscope optics to conduct confocal imaging.

Figure 3:
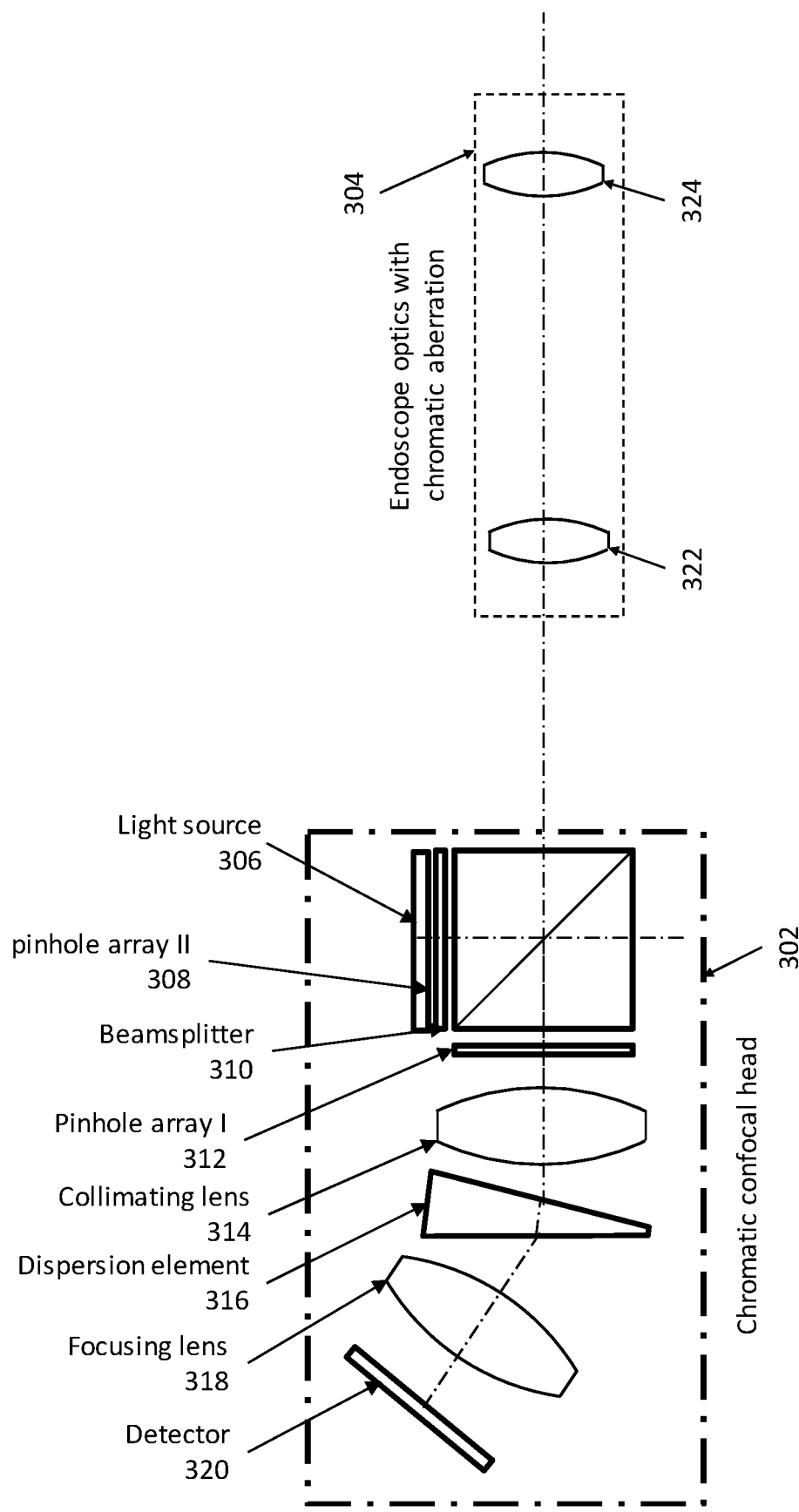
FIG. 3 shows a confocal endoscope configuration in accordance with an exemplary embodiment.

Endoscopic Systems: While the exemplary embodiments illustrated in FIGS. 1 and 2 relate to confocal microscope configurations, the same principles of operation can be applied to endoscopes. FIG. 3 shows a confocal endoscope configuration in accordance with an exemplary embodiment. The chromatic confocal head 302 includes similar components as those described in connection with FIG. 1 (e.g., pinhole array II 308, pinhole array I 312, collimating lens 314, dispersion element 316, focusing lens 318, etc.) but the beamsplitter 310 is configured to allow light from the light source 306 to be reflected from the internal surface of the beamsplitter 310 towards the endoscopic optics 304 (e.g., including two lenses 322 and 324), which are designed to include pre-set chromatic aberrations so as to allow confocal imaging at different depths. The light received from the object (not shown) passes through the beamsplitter 310 to the detector 320. The 'rotated' direction of light in the configuration of FIG. 3 compared to those in FIGS. 1 and 2, facilitates the use and attachment of the chromatic confocal head 304 to the endoscope (and its associated optics).

Figure 4:
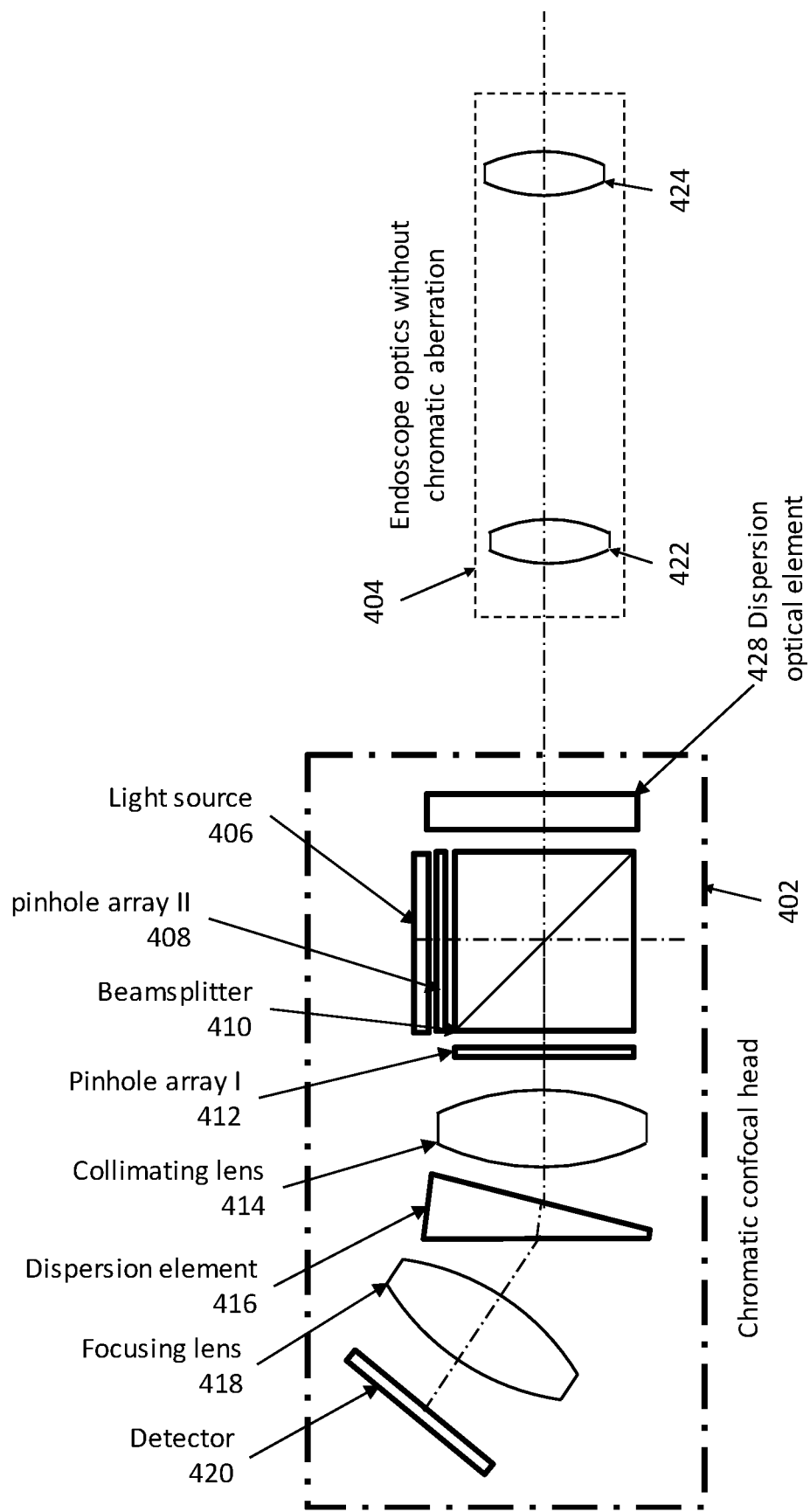
FIG. 4 illustrates another endoscope configuration in accordance with an exemplary embodiment.

FIG. 4 illustrates another endoscope configuration in accordance with an exemplary embodiment, in which the chromatic confocal head 402 includes an additional dispersion optical element 428, similar to the one shown in FIG. 2, that is coupled to the endoscope optics 404 (e.g., lenses 422 and 424) that excludes designed chromatic aberrations. The remaining components in FIG. 4 (e.g., light source 406, pinhole array II 408, beamsplitter 410, pinhole array I 412, collimating lens 414, dispersion element 416, focusing lens 418 and detector 420) are similar to those described in connection with FIG. 3. The chromatic confocal head 402 illustrated in FIG. 4 can be used as an attachment to a standard endoscope optics for 3D confocal imaging.

Figure 5:
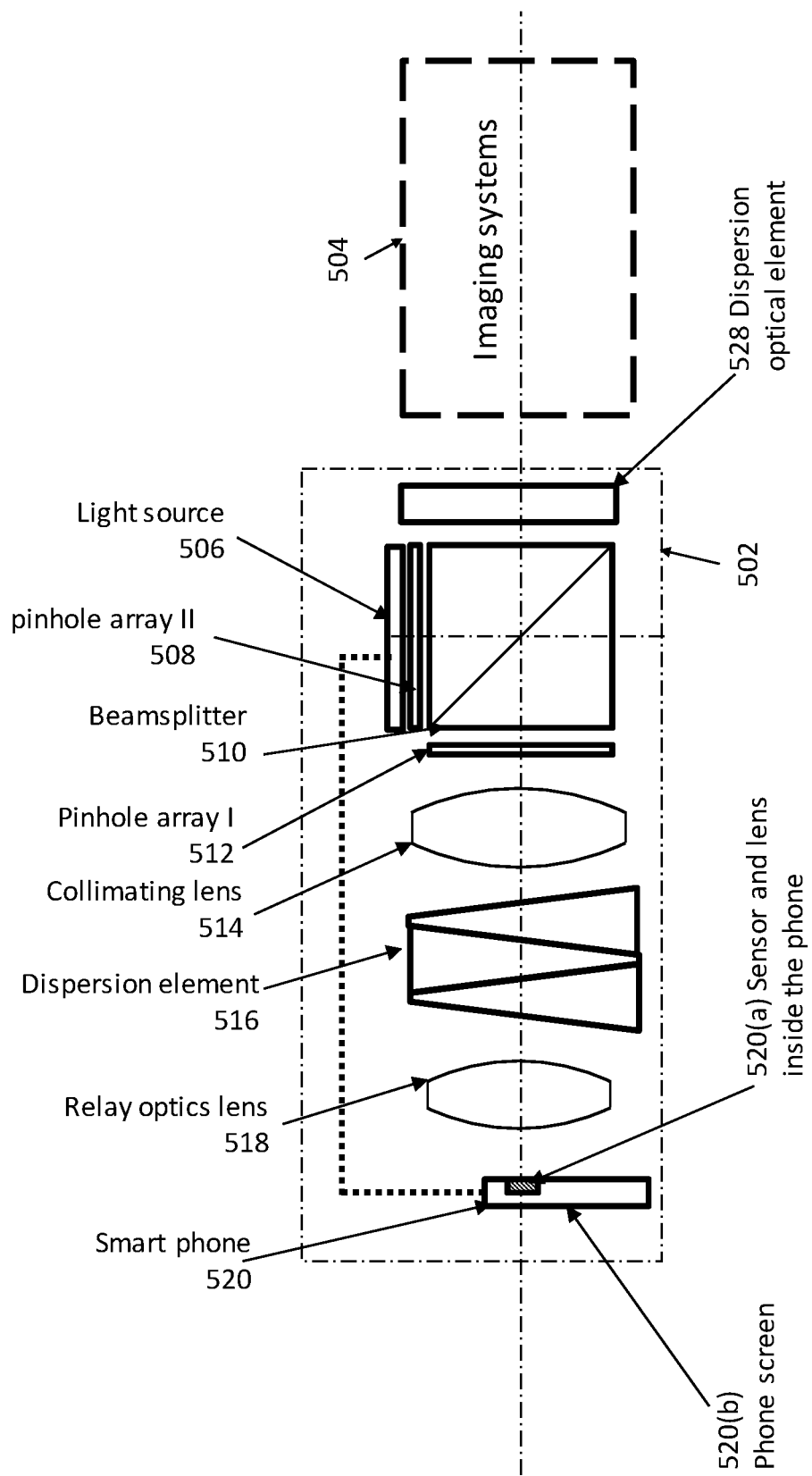
FIG. 5 illustrates a confocal system that is adapted to utilize a mobile device to capture and process images in accordance with the disclosed technology.

Mobile Systems: Another application of the disclosed chromatic confocal technology relates to their use with mobile devices, such as smart phones, tablets and similar devices. FIG. 5 shows an exemplary confocal system that, instead of using a standard detector, uses a mobile device 520 as the detector to capture, and in some instances, process and store the images in accordance with the disclosed technology. In this configuration, a double Amici prism is used as the dispersion element 516 due to its unique feature of maintaining the optical axis in the same direction (e.g., along a straight line). In some embodiments, other dispersion elements, such as the prism in FIGS. 1-4 and/or a grating, can be used. Similarly, this double Amici prism can be used as a dispersion element in FIGS. 1-4, as well. The remaining components of the confocal chromatic head 502 shown in FIG. 5 (e.g., light source 506, pinhole array II 508, beamsplitter 510, pinhole array I 512, collimating lens 514, focusing lens 518 and detector 520) are similar to those shown in FIGS. 2 and 4. In the configuration of FIG. 5, the mobile device's camera including the sensor and lens 520(a) (and a pixelated detector) is positioned to detect and capture image frames as the light source 506 array is sequenced. In some embodiments, the images can be sent to a server through a wireless connection for processing and/or storage. Alternatively, or additionally, at least some of the processing operations can be carried out at the mobile device itself. The mobile device 520 can be further coupled to the addressable light source 506 array which can be powered by a battery. For example, the mobile device 520 can be used to control the operations of the addressable light source 506, to transmit and/or receive synchronization or triggering signals to/from the addressable light source 506, or a combination thereof. The imaging system 504 of FIG. 5 can be a microscope, an endoscope, or another imaging system (e.g., as described in connection FIGS. 1-4). The screen 520(b) of the mobile device can be used, for example, to view the captured images or processed information, or to enter commands. The disclosed mobile chromatic confocal imaging systems are compact and portable, and are particularly suitable for on-site measurement in industry and medical applications in low resource settings.

Figure 6:
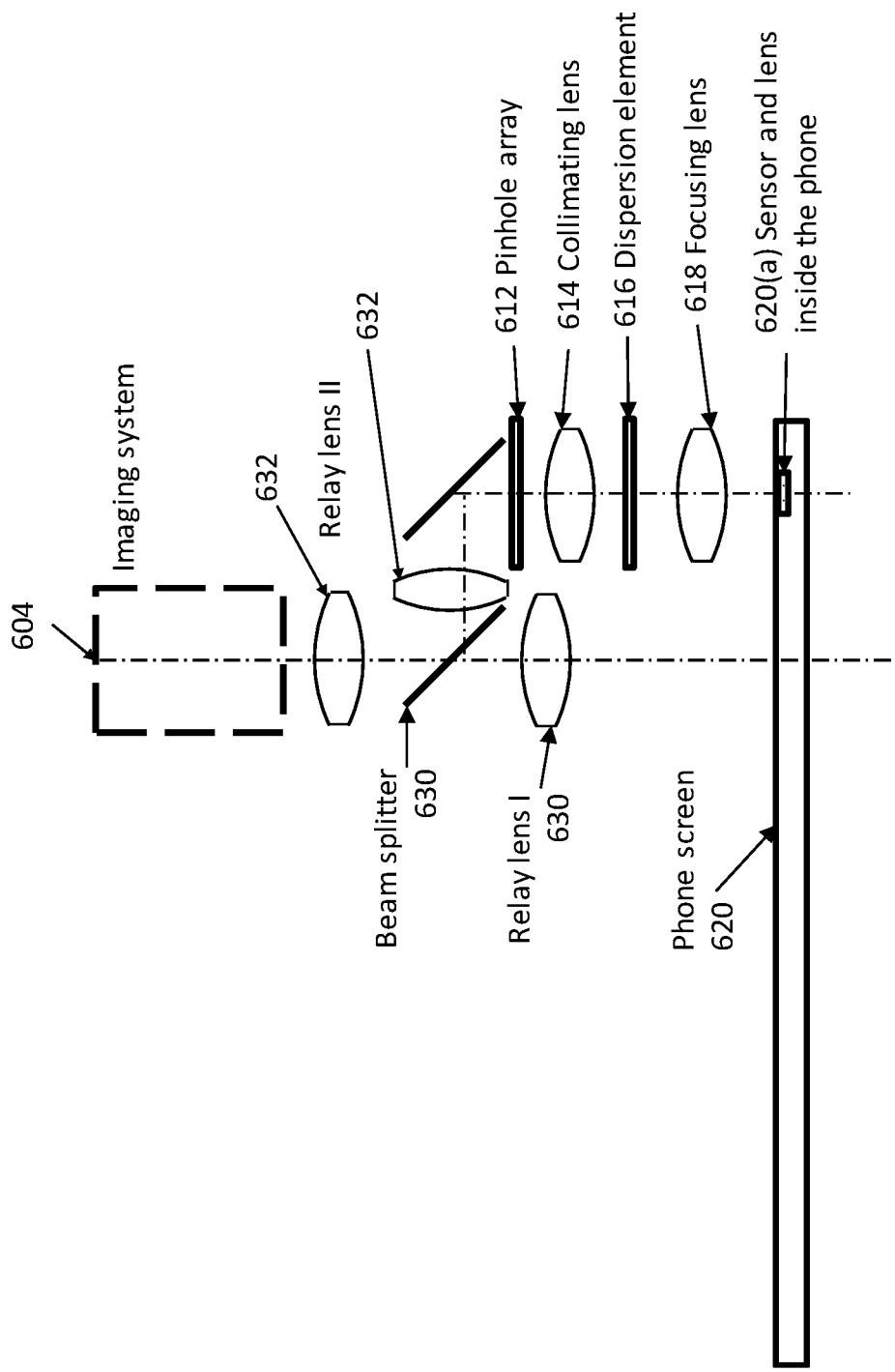
FIG. 6 illustrates a chromatic confocal system in accordance with an exemplary embodiment in which at least a part of a mobile device's screen is used as a light source.

Although FIG. 5 depicts an addressable light source array 506 as a separate component from the mobile device 520, in some embodiments, the screen of the mobile device (e.g., a portion of a smart phone screen) can be used to serve as the addressable light source array. FIG. 6 illustrates a chromatic confocal system in accordance with an exemplary embodiment in which at least a part of the mobile device's screen 620 is used as the addressable light source array and the front camera of the mobile device (including sensor and lens 620(a)) is used as the detector. In this configuration, light from the mobile device reaches a first relay lens I 630 that directs the light to a beamsplitter 610. The beamsplitter 610 passes the transmitted light onto a second relay lens II 632, which directs the light towards an imaging system 604 (which can be similar to the imaging systems in previous figures). The light reflected from an object (not shown but can be similar to the object shown in FIG. 1) is received by the imaging system 604 and then by the relay lens II 632, is reflected by the beamsplitter 610 towards to an imaging lens 634, to a reflector 636, onto the pinhole array 612, to the collimating lens 614, to the dispersion element 616, to the focusing lens 618 and to the mobile device sensor 620(a). While in this configuration relay optics are used, the overall design remains compact and cost-effective. The additional relay optical components are included to accommodate the physical locations of the mobile device's screen 620 and the sensor 620(a). The lens 634 between the beamsplitter 610 and the reflector 636 focuses the intermediate image onto the pinhole array 612.

Figure 7:
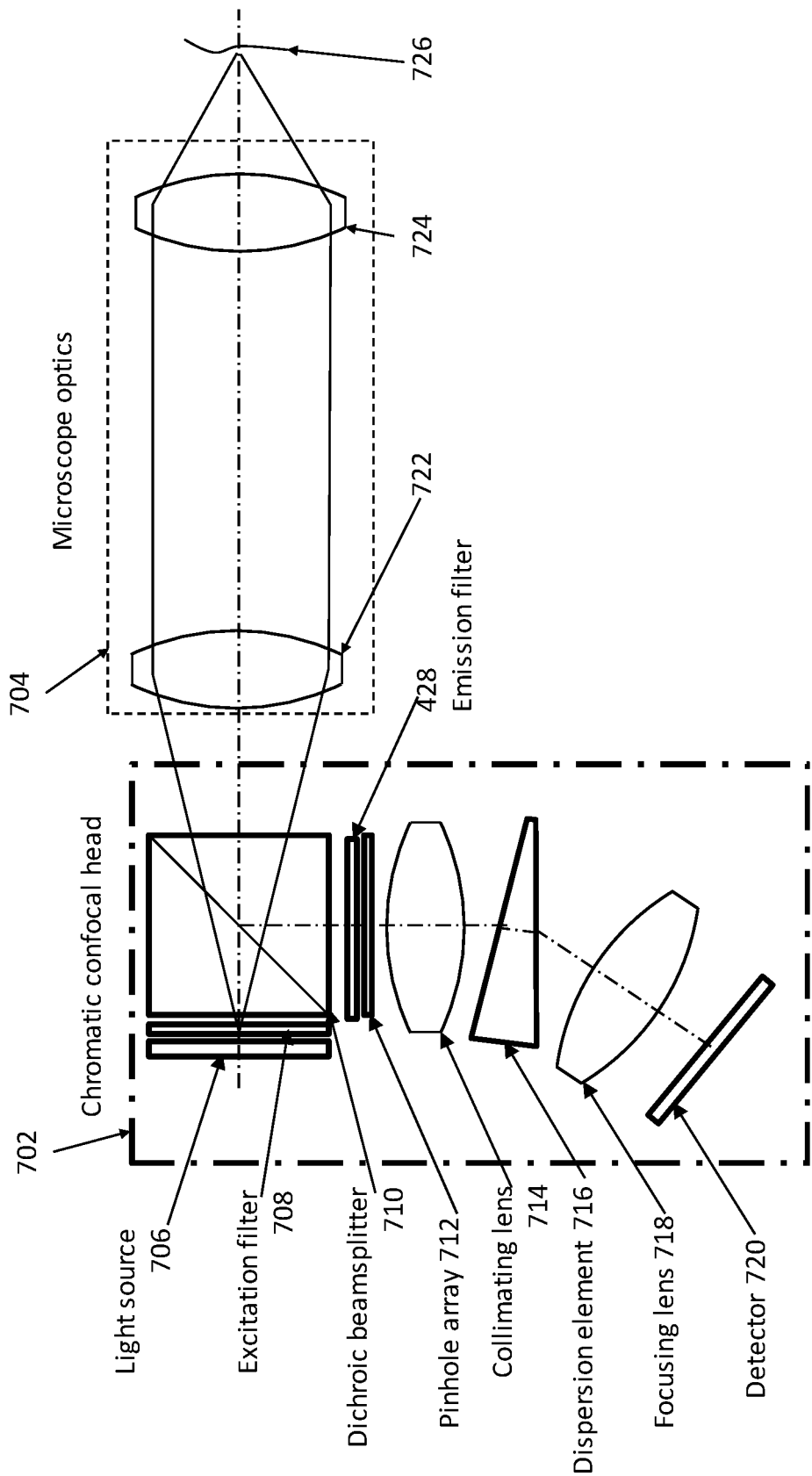
FIG. 7 illustrates a confocal system for use in fluorescence imaging in accordance with an exemplary embodiment.

Confocal Fluorescence Imaging: The disclosed technology that implements an addressable light source array further facilitates confocal fluorescence imaging techniques and applications. FIG. 7 illustrates a confocal system for use in fluorescence imaging in accordance with another exemplary embodiment. In the configuration of FIG. 7, instead of using a broadband light source array, a narrowband light source array 706 is used. In some implementations, a bandpass excitation filter 708 is added in front of the light source 706 to increase the image contrast. A dichroic beamsplitter 710 (instead of a regular beamsplitter) is used to separate the excitation and emission light. A bandpass emission filter 428 is placed in the detection path to clean the leakage of the excitation light. The pinhole array 712 can be similar to pinhole array I in previous figures. The remaining components of the chromatic confocal head 702 in FIG. 7 (e.g., collimating lens 714, dispersion element 716, focusing lens 718, detector 720, etc.) can be similar to those shown in, e.g., FIG. 1. With the configuration in FIG. 7, the fluorescence spectrum can be measured. When the dispersion element 716 and its related components are removed, only integrated fluorescence signal will be measured. The dispersion element 716, when in place, operates in a similar fashion as in FIGS. 1-4 on the broadband fluorescence light.

Additional Systems: Some of the above exemplary systems have been described as implementing an addressable broadband active light source array, such as micro LED and micro OLED. Similar configurations can be implemented for addressable passive light source arrays, as well. A passive light source array can be described as the combination of a light source and a spatial light modulator, such as liquid crystal device (LCD), a liquid crystal on silicon (LCoS) or similar devices. While it is possible to also use a DMD, a system with a DMD is typically bulky due to the illumination system, and is thus may not be suitable for handheld applications.

Figure 8:
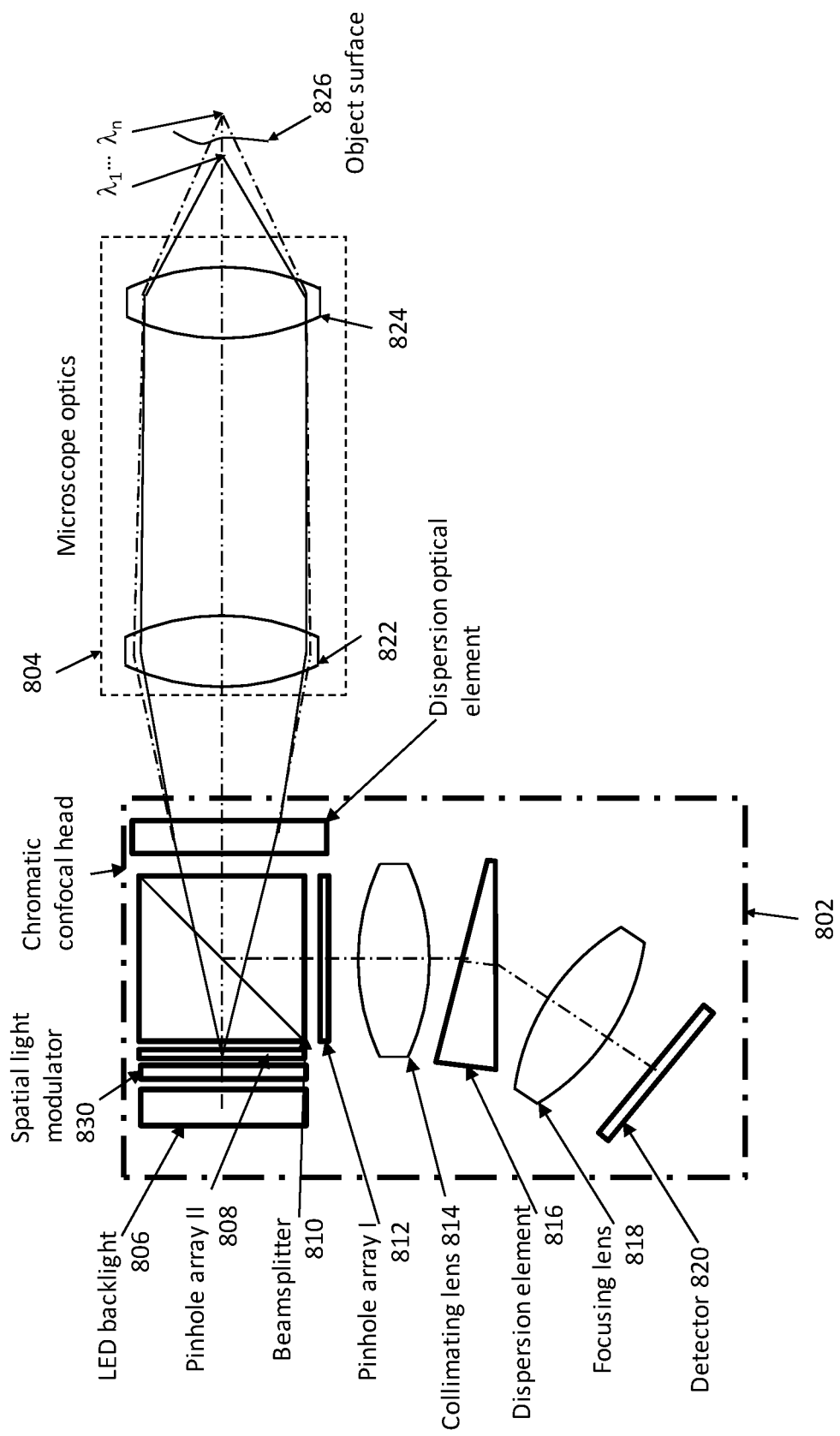
FIG. 8 illustrates a chromatic confocal system in accordance with an exemplary embodiment.

FIG. 8 illustrates a chromatic confocal system in accordance with another exemplary embodiment. In the configuration of FIG. 8, an LCD (or a spatial light modulator 830 coupled thereto) with an LED backlight 806 is used. The LED backlight 806 uniformly illuminates the LCD, and pixels of the LCD panel are alternatively turned on/off via the spatial light modulator 830 by a control software. To improve the light efficiency, a polarization beamsplitter 810 is preferably used because the light from LCD is polarized. One advantage of using the polarization beamsplitter 810 is that it removes specular reflection, which is particularly useful for tissue imaging. The remaining elements of the head 802 (e.g., pinhole array II 808, pinhole array I 812, collimating lens 814, dispersion element 816, focusing lens 818, detector 820, microscope optics 804 including lenses 822 and 824, etc.) and operations are similar to those described earlier, such as those in FIG. 1, which enable obtaining 3D images or 2D profiles of the image surface 826.

One aspect of the disclosed embodiments relates to a chromatic confocal optical head for use in a confocal imaging system that includes an illumination source including an addressable wide spectrum point source array to provide light having a wide spectrum including multiple wavelengths for illuminating an object. The chromatic confocal optical head also includes a beamsplitter configured to allow light from the illumination source to pass therethrough, or reflect from, toward the object, and to receive light reflected from the object and allow the light received from the object to propagate toward a detector. The chromatic confocal optical head further includes a first pinhole mask including a plurality of pinholes and positioned to receive the light that is reflected from the object after passing through the beamsplitter, and one or more dispersion elements positioned to receive the light that is reflected from the object after passing through the first pinhole mask, and to separate the light that passes therethrough into multiple spectral components for reception by the detector.

In one exemplary embodiment, the chromatic confocal optical head further includes a second pinhole mask positioned between the illumination source and the beamsplitter to increase a contrast of an image at the detector. In another example embodiment, the beamsplitter is a polarization beamsplitter. In yet another example embodiment, a period for the first pinhole mask is the same as that of the addressable wide spectrum point source array. In still another example embodiment, the chromatic confocal optical head is configured for use with a confocal microscope. In one example embodiment, the chromatic confocal optical head is configured for use with an endoscope.

According to another example embodiment, the chromatic confocal optical head is coupled to an imaging system that is configured to deliver light from the chromatic confocal optical head to the object and to deliver the reflected light from the object to the chromatic confocal optical head, and wherein one or more of optical components of the imaging system is designed to include pre-set chromatic aberrations so as to allow different spectral components of the light from the illumination source to come to focus at different focal depths on or in the vicinity of the object.

Another aspect of the disclosed embodiments relates to a chromatic confocal optical head for use in confocal imaging system that includes an illumination source including an addressable wide spectrum point source array to provide light having wide spectral illumination of an object. The chromatic confocal optical head also includes a beamsplitter configured to allow light from the illumination source to pass therethrough, or reflect from, toward the object, and to receive light reflected from the object and allow the light received from the object to propagate toward a detector. The chromatic confocal optical head further includes one or more dispersion elements positioned to separate at least some of the spectral components of the illumination spectrum from the illumination wide spectrum point source array prior to reaching the object, and a first pinhole mask including a plurality of pinholes and positioned to receive the light that is reflected from the object after passing through the beamsplitter. The chromatic confocal optical head additionally includes a second dispersion element positioned to receive the light that is reflected from the object after passing through the first pinhole mask, and to separate the light that passes therethrough into multiple spectral components for reception by the detector.

In one example embodiment, the chromatic confocal optical head is coupled to either a standard microscope objective without designed chromatic aberrations, or to a standard endoscope optical assembly without designed chromatic aberrations. According to another example embodiment, the chromatic confocal optical head also includes the detector that is configured to receive the reflected light from the object after passing through the one or more dispersion elements, and a processor coupled to the detector and to a memory including instructions stored thereupon; the instructions when executed by the processor cause the processor to process information received from the detector corresponding to lateral and axial scanning of the object, and to produce volumetric information regarding the object.

Another example embodiment relates to a system that includes the chromatic confocal optical head and further includes a mobile device, where a camera of the mobile device comprises the detector and is positioned to receive the light that is reflected from the object after passing through the one or more dispersion elements. In another example embodiment, a processor of the mobile device is configured to process information received from the detector corresponding to lateral and axial scanning of the object, and to produce volumetric information regarding the object. In yet another example embodiment, the mobile device is one of a smart phone or a tablet device. In still another example embodiment, the illumination source is part of a screen in the mobile device.

In one example embodiment, one or more dispersion elements are configured to produce a straight optical path between the detector and the beamsplitter. In another example embodiment, a processor coupled to the detector is configured to communicate with a remote device, where at least part of processing of information associated with lateral and axial scanning of the object is carried out at the remote device. In yet another example embodiment, the illumination source is configured to turn on and off individual elements of the point source array in accordance with a temporal sequence. According to another example embodiment, the illumination source includes a micro LED array or a micro OLED array. In some example embodiments, the one or more dispersion elements includes one of a grating or a prism. In still other exemplary embodiments, at least one of the pinhole masks includes a dynamic pinhole array. For example, the dynamic pinhole array can include an LCD device.

Another aspect of the disclosed embodiments relates to a confocal fluorescence imaging system that includes an illumination source including an addressable narrow spectrum point source array to excite a fluorescence in an object, a pinhole mask, an imaging system, an excitation filter to control an illumination spectrum of the illumination source, an emission filter to control fluorescence spectrum of light emitted from the object, a dichroic mirror to separate the excitation and emission spectra, and a spectral measuring system to measure spectrum of light that is reflected from the object. In the confocal fluorescence imaging system, the above components are positioned to allow light from the illumination source, upon passing through the excitation filter and the dichroic filter, to reach the imaging system for illuminating the object, and the fluorescence light emitted from object upon passing through the imaging system, the dichroic filter, the pinhole mask and the emission filter to reach the spectral measuring system. In one example embodiment, the illumination source includes a micro LED array or a micro OLED array.

The processing devices that are described in connection with the disclosed embodiments can be implemented as hardware, software, or combinations thereof. For example, a hardware implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application.

Various embodiments described herein are described in the general context of methods or processes, which may at least in-part be implemented by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A chromatic confocal optical head for use in a confocal imaging system, comprising:
    an illumination source including an addressable wide spectrum point source array to provide light having a wide spectrum including multiple wavelengths for illuminating an object, the addressable wide spectrum point source array including a plurality of individual broadband point sources wherein each broadband point source in the point source array is individually addressable to enable lateral scan of the object;
    a beamsplitter to receive light from the illumination source without an intervening modulator and configured to allow the light from the illumination source to pass therethrough, or reflect from, toward the object, and to receive light reflected from the object and allow the light received from the object to propagate toward a detector;
    a first pinhole mask including a plurality of pinholes and positioned to receive the light that is reflected from the object after passing through the beamsplitter; and
    one or more dispersion elements positioned to receive the light that is reflected from the object after passing through the first pinhole mask, and to separate the light that passes therethrough into multiple spectral components for reception by the detector.

2. The chromatic confocal optical head of claim 1, further including a second pinhole mask positioned between the illumination source and the beamsplitter to increase a contrast of an image at the detector.

3. The chromatic confocal optical head of claim 1, wherein the beamsplitter is a polarization beamsplitter.

4. The chromatic confocal optical head of claim 1, wherein a period for the first pinhole mask is the same as that of the addressable wide spectrum point source array.

5. The chromatic confocal optical head of claim 1, wherein the chromatic confocal optical head is configured for use with a confocal microscope.

6. The chromatic confocal optical head of claim 1, wherein the chromatic confocal optical head is configured for use with an endoscope.

7. The chromatic confocal optical head of claim 1, wherein the chromatic confocal optical head is coupled to an imaging system that is configured to deliver light from the chromatic confocal optical head to the object and to deliver the reflected light from the object to the chromatic confocal optical head, and wherein one or more of optical components of the imaging system is designed to include pre-set chromatic aberrations so as to allow different spectral components of the light from the illumination source to come to focus at different focal depths on or in the vicinity of the object.

8. A chromatic confocal optical head for use in confocal imaging system, comprising:
an illumination source including an addressable wide spectrum point source array to provide light having wide spectral illumination of an object, the addressable wide spectrum point source array including a plurality of individual broadband point sources wherein each broadband point source in the point source array is individually addressable to enable lateral scan of the object;
a beamsplitter to receive light from the illumination source without an intervening modulator and configured to allow the light from the illumination source to pass therethrough, or reflect from, toward the object, and to receive light reflected from the object and allow the light received from the object to propagate toward a detector;
one or more dispersion elements positioned to separate at least some of the spectral components of the illumination spectrum from the illumination wide spectrum point source array prior to reaching the object;
a first pinhole mask including a plurality of pinholes and positioned to receive the light that is reflected from the object after passing through the beamsplitter; and
a second dispersion element positioned to receive the light that is reflected from the object after passing through the first pinhole mask, and to separate the light that passes therethrough into multiple spectral components for reception by the detector.

9. The chromatic confocal optical head of claim 8, wherein the chromatic confocal optical head is coupled to either a standard microscope objective without designed chromatic aberrations, or to a standard endoscope optical assembly without designed chromatic aberrations.

10. The chromatic confocal optical head of claim 8, further including:
the detector that is configured to receive the reflected light from the object after passing through the one or more dispersion elements; and
a processor coupled to the detector and to a memory including instructions stored thereupon, wherein the instructions when executed by the processor cause the processor to process information received from the detector corresponding to lateral and axial scanning of the object, and to produce volumetric information regarding the object.

11. The chromatic confocal optical head of claim 1, wherein the chromatic confocal optical head is part of a system that includes a mobile device, wherein a camera of the mobile device comprises the detector and is positioned to receive the light that is reflected from the object after passing through the one or more dispersion elements.

12. The chromatic confocal optical head of claim 11, wherein a processor of the mobile device is configured to process information received from the detector corresponding to lateral and axial scanning of the object, and to produce volumetric information regarding the object.

13. The chromatic confocal optical head of claim 11, wherein the mobile device is one of a smart phone or a tablet device.

14. The chromatic confocal optical head of claim 11, wherein the illumination source is part of a screen in the mobile device.

15. The chromatic confocal optical head of claim 1, wherein the one or more dispersion elements are configured to produce a straight optical path between the detector and the beamsplitter.

16. The chromatic confocal optical head of claim 10, wherein a processor coupled to the detector is configured to communicate with a remote device, wherein at least part of processing of information associated with lateral and axial scanning of the object is carried out at the remote device.

17. The chromatic confocal optical head of claim 1, wherein the illumination source is configured to turn on and off individual broadband light sources of the point source array in accordance with a temporal sequence.

18. The chromatic confocal optical head of claim 1, wherein the illumination source includes a micro LED array or a micro OLED array.

19. The chromatic confocal optical head of claim 1, wherein the one or more dispersion elements includes one of a grating or a prism.

20. The chromatic confocal optical head of claim 2, wherein at least one of the pinhole masks includes a dynamic pinhole array.

21. The chromatic confocal optical head of claim 20, wherein the dynamic pinhole array includes an LCD device.

22. A confocal fluorescence imaging system, comprising:
an illumination source including an addressable narrow spectrum point source array to excite a fluorescence in an object, the addressable wide narrow spectrum point source array including a plurality of individual narrow spectrum point sources wherein each narrow spectrum point source in the point source array is individually addressable to enable lateral scan of the object without a need for a further modulator;
a pinhole mask;
an imaging system;
an excitation filter to control an illumination spectrum of the illumination source;
an emission filter to control fluorescence spectrum of light emitted from the object;
a dichroic beamsplitter to separate the excitation and emission spectra; and
a spectral measuring system to measure spectrum of light that is reflected from the object, wherein
the illumination source, the excitation filter, the dichroic beamsplitter, the imaging system, the pinhole mask and the emission filter are poisoned to allow light from the illumination source, upon passing through the excitation filter and the dichroic filter, to reach the imaging system for illuminating the object, and the fluorescence light emitted from object upon passing through the imaging system, the dichroic filter, the pinhole mask and the emission filter to reach the spectral measuring system.

23. The confocal fluorescence imaging system of claim 22, wherein the illumination source includes a micro light emitting diode (LED) array or a micro organic LED (OLED) array.

* * * * *